(12) United States Patent
Weßkamp

(10) Patent No.: US 12,512,982 B2
(45) Date of Patent: Dec. 30, 2025

(54) METHOD FOR CHANGING AN EXISTING ACCESS KEY IN A FIELD DEVICE IN AUTOMATION TECHNOLOGY

(71) Applicant: KROHNE Messtechnik GmbH, Duisburg (DE)

(72) Inventor: Patrick Weßkamp, Mülheim (DE)

( * ) Notice: Subject to any disclaimer, the term of this patent is extended or adjusted under 35 U.S.C. 154(b) by 291 days.

(21) Appl. No.: 18/159,417

(22) Filed: Jan. 25, 2023

(65) Prior Publication Data

US 2024/0113874 A1    Apr. 4, 2024

(30) Foreign Application Priority Data

Jan. 25, 2022   (DE) .......................... 102022101689.7

(51) Int. Cl.
*H04L 29/06* (2006.01)
*H04L 9/08* (2006.01)

(52) U.S. Cl.
CPC .......... *H04L 9/0891* (2013.01); *H04L 9/0894* (2013.01)

(58) Field of Classification Search
CPC ... H04L 9/0891; H04L 9/0894; H04L 63/062; H04L 9/0863; H04L 9/0825; H04L 9/0869; H04L 9/088; H04L 9/3228
See application file for complete search history.

(56) References Cited

U.S. PATENT DOCUMENTS

| | | | | |
|---|---|---|---|---|
| 6,947,556 B1 * | 9/2005 | Matyas, Jr. | ........... | H04L 9/3213 380/43 |
| 9,698,975 B2 * | 7/2017 | Nagarajan | ............. | H04L 9/0891 |
| 10,356,064 B1 * | 7/2019 | Howard | ............... | H04L 63/0428 |
| 11,032,287 B1 * | 6/2021 | Wang | ....................... | H04L 63/20 |
| 2005/0195975 A1 * | 9/2005 | Kawakita | .............. | H04L 9/3236 380/30 |
| 2008/0246587 A1 * | 10/2008 | Fisher | ................. | E05B 19/0005 340/5.73 |
| 2008/0288786 A1 * | 11/2008 | Fiske | .................... | H04L 9/0891 713/190 |
| 2009/0292918 A1 | 11/2009 | Mori et al. | | |
| 2011/0161349 A1 * | 6/2011 | Ireland | .................... | G06F 16/27 707/769 |

(Continued)

FOREIGN PATENT DOCUMENTS

| | | | | |
|---|---|---|---|---|
| AU | 2003220673 A1 * | 10/2003 | ........... | H04L 63/068 |
| CN | 106878009 B * | 4/2021 | ............. | H04L 63/06 |

(Continued)

*Primary Examiner* — Sher A Khan
(74) *Attorney, Agent, or Firm* — Patrick D. Duplessis

(57) ABSTRACT

A method for changing an existing access key in a field device in automation technology includes the steps of: providing a key database on a database server; generating a key data set for a user authorized to access or a control unit authorized to access from the key database; and transferring the key data set to the control unit of the access-authorized user or the access-authorized control unit, so that the control unit of the access-authorized user or the access-authorized control unit has the existing access keys of the field devices for which an access authorization exists. The key database is for a plurality of field devices and contains at least a field device identifier of a respective field device, the existing access key of the respective field device and the identifier of a user authorized to access and/or a control unit authorized to access the respective field device.

8 Claims, 8 Drawing Sheets

(56) References Cited

U.S. PATENT DOCUMENTS

| | | | | |
|---|---|---|---|---|
| 2012/0170751 A1* | 7/2012 | Wurm | .................. | H04L 9/0897 |
| | | | | 380/278 |
| 2012/0310882 A1* | 12/2012 | Werner | .............. | H04L 67/1095 |
| | | | | 707/610 |
| 2013/0145160 A1* | 6/2013 | Bursell | .............. | G06F 21/6218 |
| | | | | 713/168 |
| 2014/0058543 A1* | 2/2014 | Gerding | ............ | G05B 19/0425 |
| | | | | 700/83 |
| 2017/0317828 A1* | 11/2017 | Reinhold | ............. | H04L 63/083 |
| 2018/0114220 A1* | 4/2018 | Ekberg | .................... | H04L 9/007 |
| 2018/0349127 A1* | 12/2018 | Haase | ..................... | G06F 8/654 |
| 2019/0273613 A1* | 9/2019 | Diaz | ....................... | H04L 9/006 |
| 2021/0226768 A1* | 7/2021 | Irazabal | ............... | H04L 9/3239 |
| 2021/0226777 A1* | 7/2021 | Wilson | ................. | H04L 9/0861 |
| 2021/0279361 A1* | 9/2021 | Apsingekar | ........... | H04L 9/3239 |
| 2021/0334239 A1* | 10/2021 | Banister | ............... | G06F 16/258 |
| 2022/0245103 A1* | 8/2022 | Elder | ................. | G06F 16/1873 |

FOREIGN PATENT DOCUMENTS

| | | | | |
|---|---|---|---|---|
| DE | 102005053332 A1 * | 5/2007 | ......... | G05B 19/0426 |
| DE | 102013111690 A1 * | 5/2015 | ......... | H04L 63/0428 |
| DE | 102016117289 A1 * | 3/2018 | ........... | H03K 17/943 |
| DE | 102018107928 A1 * | 10/2019 | ............ | G06F 21/44 |
| EP | 2474911 A1 * | 7/2012 | ........ | H04L 67/1095 |
| EP | 3312692 A1 | 4/2018 | | |
| JP | 2015528236 A * | 9/2015 | | |
| KR | 100839445 B1 * | 6/2008 | | |
| KR | 20170076742 A * | 7/2017 | ........... | H04L 9/0841 |

* cited by examiner

METHOD FOR CHANGING AN EXISTING ACCESS KEY IN A FIELD DEVICE IN AUTOMATION TECHNOLOGY

TECHNICAL FIELD

The invention relates to a method for changing an existing access key in a field device of automation technology, wherein a field device identifier and the existing access key are stored in the field device, wherein a control unit can be connected to the field device via a communication link, wherein a control unit identifier and the existing access key are stored in the control unit wherein the field device checks the access authorization of the control unit by at least indirect evaluation of its existing access key and the existing access key of the control unit, and wherein, if the access authorization is present, the control unit agrees on a new access key with the field device, which new access key the field device stores as the new existing access key.

BACKGROUND

Field devices in automation technology are measuring devices or also actuators that are connected to a physical process, for example an industrial process system, and supply measurement data of corresponding process variables (for example flow rates, fill levels, temperatures, pressures, pH values) or also act on the process, for example by controlling valves, motors or heating elements. In a technical process, a large number of field devices are usually in use, not infrequently several tens or even several hundreds of field devices. The field devices are usually at least partially connected to each other via a serial fieldbus and can be addressed via corresponding fieldbus messages or send information themselves via fieldbus messages.

For maintenance or parameterization of individual field devices, it is provided that the respective field device is connected to a control unit via a communication link. This communication link is often different from the fieldbus interface of the field device, it can be proprietary, but it is often based on established standards (e.g. USB, Bluetooth, Ethernet). In the cases considered here, it is desired for security reasons that not just any control unit or any user can gain access to the field device; rather, it is desired that certain control units or users of control units should have no access at all, or possibly only limited access to the field device. To ensure this, a connected control unit must first identify itself to the field device. This is done here by the field device checking the access authorization of the control unit by at least indirect evaluation of its existing access key and the existing access key of the control unit. This can be done by direct evaluation of said existing access keys, in that the control unit transmits its existing access key to the field device and the field device checks whether an access authorization is associated with the existing access key (direct comparison of the existing access keys). However, this can also be done by indirect evaluation of the said existing access keys by deriving check values using the existing access keys on the field device and on the control unit, which consequently depend on the respective existing access key, and then evaluating these derived check values: the existing access keys are thus actually evaluated indirectly here and are not transmitted as such between the field device and the control unit. Examples of such indirect evaluations are challenge-response authentication, the zero-knowledge method, or Password Authenticated Connection Establishment (PACE). Only then is the control unit granted access to functions and parameters of the field device—possibly only within a determined scope of rights.

In the situation considered here, the control unit—in the case of an existing access authorization—agrees on a new access key with the field device, which the field device then stores as a new existing access key, i.e. saves it in terms of data; the agreed new access key is also ultimately stored in the control unit as a new existing access key. It is known that the agreement of the new access key between the field unit and the control unit is implemented in such a way that the new access key is first established on the control unit (for example, by user input) and is transmitted from here to the field unit. The establishment of a new existing access key can be motivated in different ways. For example, the existing access key may be changed to re-establish a defined security state, such as when there is uncertainty about whether the old existing access key may have been propagated in an unintended manner. The existing access key may be renewed as part of an established security protocol by the passage of time, after a determined number of connections have been established over the communications link, or simply at random. The existing access key can also be renewed by spontaneous user intervention, for example by entering a new existing access key into the control unit. In any case, the question arises as to how the new existing access key can be managed as cleverly as possible, so that, for example, users and/or control units that are also authorized to access the field device but only have the old existing access key are not excluded from accessing the field device.

SUMMARY

It is therefore the object of the present invention to design and further develop the method described at the beginning for changing an existing access key in a field device in such a way that a change of the existing access key is handled as cleverly as possible and with little effort, even in the case of use by several authorized users and/or control units.

The object described and derived above is initially solved in the method described at the beginning in that a key database is provided on a database server and the key database for a plurality of field devices comprises at least the field device identifier of the respective field device, the existing access key of the respective field device and the identifier of at least one access-authorized user and/or at least one access-authorized control unit to the respective field device. The access authorization can thus be linked to a person, for example, the access-authorized user, or to a technical device, for example, the access-authorized control unit. An access-authorized user could, for example, make any control unit an access-authorized control unit by the access-authorized user identifying himself/herself to the control unit as authorized to use it.

It is further provided that the database server generates a key data set for at least one access-authorized user or at least one access-authorized control unit from the key database, wherein the key data set for the field devices to which the access-authorized user or the access-authorized control unit has access authorization comprises the field device identifier and the existing access key of the respective field device. This measure ensures that all data relevant for access to a field device or to several field devices is stored centrally in a central database server and that individual key data sets can be generated from the key database. The field device identifier is an information technology datum that is unique to the field device. It can be the factory serial number of the field device, but it can also be unique information that has been assigned to the field device subsequently, for example when setting up the system in which the field device is installed.

The database server can be technically implemented in many different ways, for example, it can be implemented as a service of an already existing control room, as a database server implemented separately in terms of hardware, which can be contacted locally in the environment of the system in which the field devices are installed, it can also be implemented as an outsourced cloud service in the World Wide Web, if this is compatible with the specified requirements for data security. Similarly, establishing a connection between the control unit and the database server and exchanging data between the devices is possible in various ways, depending on the aforementioned implementation of the database server. However, the exact implementation of the database server and the information technology contacting of the database server by control units are not important in detail.

The method further provides that the key data set is transferred to the control unit of the access-authorized user or to the access-authorized control unit, so that the control unit of the access-authorized user or the access-authorized control unit has the existing access keys of the field devices for which access authorization exists.

The measures described make it possible to centrally manage existing access keys for a field device or for several field devices and to provide access-authorized users or access-authorized control units with a key data set derived individually from the key database. Of course, this is also possible and especially advantageous in cases where access information, i.e. existing access keys, change or have changed.

In a further development of the method, it is provided that the key data set is encrypted before it is transmitted to the control unit of the access-authorized user or to the access-authorized control unit, and the encrypted key data set is decrypted on the control unit before it is used. This implements an additional level of data security. Encryption and decryption can be implemented with varying degrees of complexity. In a simple variation, symmetric keys can be used, which are stored on the database server and at the access-authorized user or the access-authorized control unit. In a more complex implementation, asymmetric keys are used, wherein the public key for each access-authorized user or for each access-authorized control unit is stored on the database server, and the access-authorized user or the access-authorized control unit has the corresponding private key, so that the key data set encrypted with the public key can then be decrypted with the corresponding private key on the access-authorized control unit.

Another preferred further development of the method is that the original entry time of the existing access key is also noted in the key database and in the key data set generated from the key database for the existing access keys. This makes it possible to identify which existing access key is the more current of several existing access keys. It is important that only the time of the original creation of the existing access key is noted, and not, for example, on each device to which the existing access key is transferred and noted. However, this is possible without further ado, since it can be clearly decided at any time during the method whether an existing access key or a new access key is being newly created or whether a known existing access key that has already been created is merely being passed on.

In connection with the noting of entry times of existing access keys, another further development of the method provides that in a synchronization step the key database and the key data set of at least one control unit are compared with regard to the entry times of corresponding existing access keys, and, in the event of differing entry times, the latest existing access key is subsequently entered with its entry time where only the older existing access key is present, so that the key database and the key data set of the control unit have matching existing access keys for the respective field device. Preferably, the synchronization step is carried out automatically as soon as a control unit connects to the key database. Preferably, the subsequently entered newest existing access key does not replace the older existing access key, but the subsequently entered newest existing access key is noted in addition to the older existing access key so that the previously valid existing access key is also still available. Even older existing access keys are deleted in another preferred design, so that only the last two most recent versions of the existing access key are available.

The further development of the method described below deals with the case where a new existing access key is provided directly into a field device or is provided in the field device via a control unit connected to the field device. Preferably, a new access key is provided to the field device by the control unit connected to the field device via the communication link, and the new access key is stored by the field device as a new existing access key, wherein the control unit stores the new access key as a new existing access key in its key data set. Either the control unit connects to the key database and the synchronization step is initiated, or the control unit prompts the user of the control unit to connect to the key database to carry out the synchronization step. This ensures that the newly defined new access key is also updated in the key database, even if the new access key was provided for the first time by the user of the control device or by the control unit on the field device. The local information of the new access key on the control unit and the field device is made available to all users by transferring it to the key database.

The following implementation of the method deals with the specific case where a new access key for a field device is initially provided on the key database. In this case, the new access key is stored by the key database for the field device as a new existing access key and at least the last valid existing access key for the field device remains stored in the key database as the old existing access key. When the key data set is generated, the new existing access key and at least the last valid existing access key for the field device are included in the key data set. In particular, in the synchronization step, when the latest existing access key is subsequently entered, at least the previously valid older existing access key is retained. In contrast to the previously mentioned implementation, in which the new access key was first provided on the control unit, here the new access key is first provided on the database server or in the key database of the database server. Here, too, it proves advantageous if not only the new access key is stored as the new existing access key, but at least the last valid existing access key is also stored before the new access key is recorded as the new existing access key.

A preferred further development of the aforementioned method is characterized in that the control unit is connected to the field device to which it has access authorization, that the control unit has a key data set with the existing access key and the previously valid existing access key for the field device, that the control unit uses the previously valid existing access key to obtain access authorization to the field device and, when access authorization is granted, transmits the existing access key to the field device as a new access key.

An alternative implementation of the aforementioned implementation of the method provides that the control unit is connected to the field device to which it has access authorization, that the control unit has a key data set with the existing access key and the previously valid existing access key for the field device, that the control unit first uses the existing access key to obtain access authorization to the field device and, if access authorization is denied, uses the previously valid existing access key. This example shows that storing the previously valid existing access key as the new existing access key after a new access key has been announced is advantageous, namely when the field device does not (yet) know about the new access key that has been marked in the key database but has not yet been made known to the field device.

A further development of the method, in which the new access key has initially been provided in the key database, is characterized in that the new access key, which is stored in the key database for the field device as a new existing access key, is provided with a synchronization flag, wherein the synchronization flag indicates whether the new existing access key is stored on the field device or is not stored on the field device, and that the synchronization flag initially indicates that the existing access key is not stored on the field device. When the key data set is generated, the synchronization flag is included in the key data set. In the synchronization step, the synchronization flag is matched, wherein the synchronization flag is only changed from "existing access key not stored on the field device" to "existing access key stored on the field device".

In a further development of the preceding method step, the control unit is connected to the field device and the control unit evaluates the synchronization flag of the existing access key. In the case where the synchronization flag indicates "existing access key not stored on the field device", the control unit uses the previously valid existing access key to obtain access authorization to the field device and otherwise it uses the existing access key.

In an additional further development of the method, the control unit is connected to the field device to which it has access authorization, and the control unit changes the synchronization flag of the transmitted new existing access key to "existing access key stored on field device" in its key data set after transmission of the new existing access key to the field device.

In another preferred design of the method, if the access authorization is available, the control unit agrees on a new access key with the field device by the control unit requesting the field device to provide a new access key, i.e., to transmit a new access key to the control unit. The field device may generate the new-access key, for example, by a random number generator, in particular by a non-deterministic random number generator. The new access key generated by the field device can be immediately stored on the field device as a new existing access key, but it may also be necessary for the new access key to be retransmitted as such from the control unit to the field device first in order to complete the setup of the new access key.

BRIEF DESCRIPTION OF THE DRAWINGS

In detail, there is now a plurality of possibilities for designing the method according to the invention for changing an existing access key in a field device. Corresponding further embodiments are described below, reference is made to the following description in conjunction with the drawings.

DETAILED DESCRIPTION

The figures show in whole or in part a method 1 for changing an existing access key $F1\_CUR$ in a field device $F1$ of the automation technology. It goes without saying that in automation or process engineering systems encountered in practice, a large number of field devices are used, which are usually interconnected via a field bus. For the sake of clarity, only one field device $F1$ is shown here at a time, but this does not limit the generality of the illustration.

Figure 1:
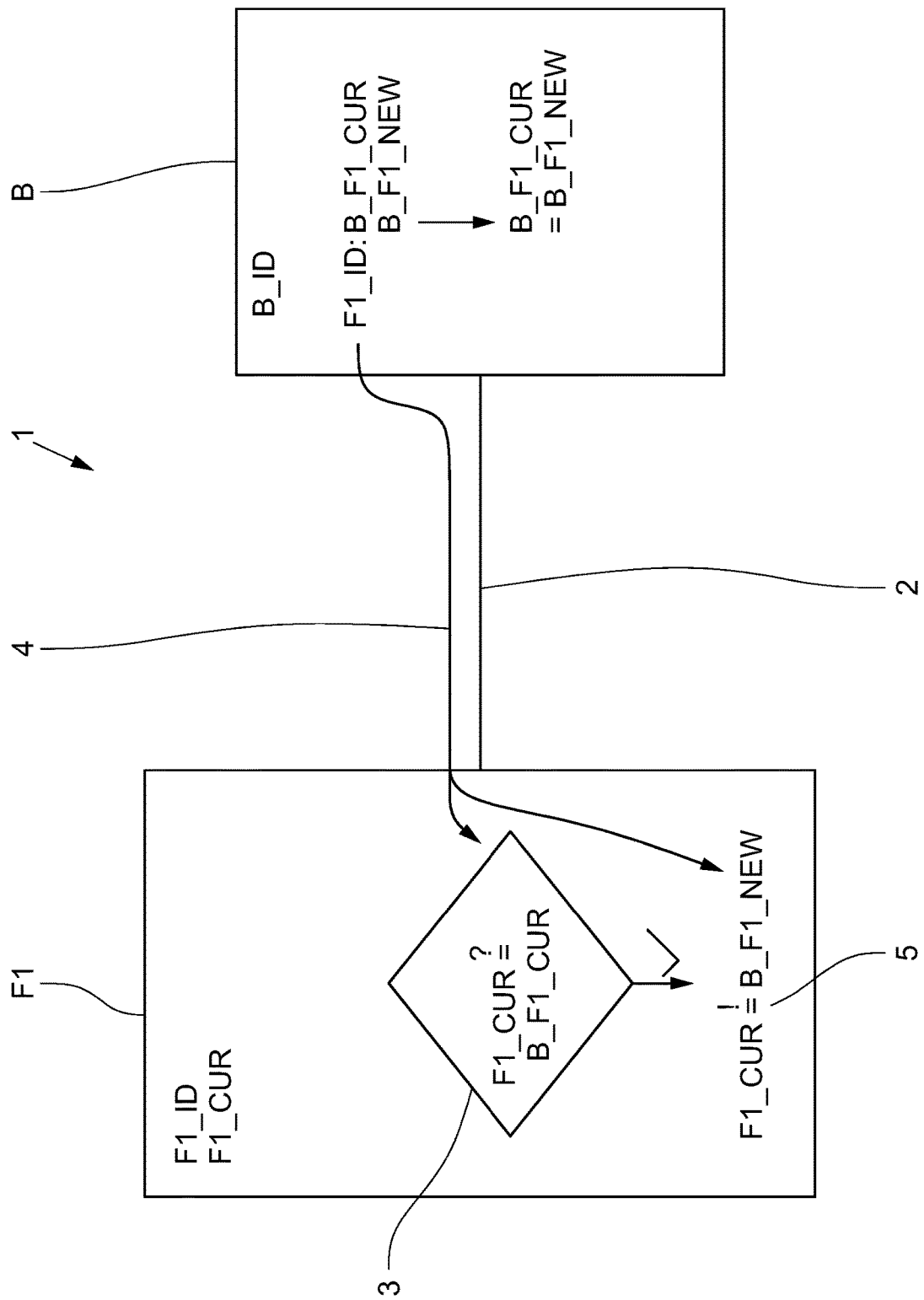
FIG. 1 schematically illustrates the method for changing an existing access key in a field device, as known from the prior art.

The embodiment shown in FIG. 1 illustrates a method 1 known from the to prior art for changing the existing access key $F1\_CUR$ in the field device $F1$. The field device $F1$ has a field device identifier $F1\_ID$ by which it can be uniquely identified. The existing access key $F1\_CUR$ is also stored on the field device $F1$. A control unit B can be connected to the field device $F1$ via a communication link 2 and it is also connected to the field device $F1$ in FIG. 1. The control unit B may be, for example, a cell phone, a handheld computer, a tablet, a laptop computer, etc.; in the embodiment, it is a cell phone with a corresponding app.

The control unit B stores a control unit identifier $B\_ID$ and an existing access key $B\_F1\_CUR$. When the control unit B is connected to the field device $F1$, the field device $F1$ tries to find out to what extent the control unit B has access authorization to the field device $F1$. As a result of a data exchange serving this purpose, the exact sequence of which is not of interest here in detail, the field device $F1$ in the embodiment shown learns, in any case, the existing access key $B\_F1\_CUR$, which is stored on the control unit B for the field device $F1$. The field device $F1$ checks the access authorization of the control unit B by directly evaluating 3 its own existing access key $F1\_CUR$ and the existing access key $B\_F1\_CUR$ of the control unit B for the field device $F1$. As explained in the general description section, an evaluation of the existing access keys $F1\_CUR$, $B\_F1\_CUR$ can also be performed indirectly (not shown) by deriving test values using the respective existing access keys $F1\_CUR$, $B\_F1\_CUR$ on the control unit B and the field device $F1$, which are then subjected to a comparison. If the control unit B is authorized to access the field device $F1$, the control unit B transmits a new access key B_F1_NEW to the field device F1, which new access key B_F1_NEW is stored by the field device F1 as the new existing access key F1_CUR. 5. The new access key B_F1_NEW may have been stored in the control unit B, it may have been entered by the user of the control unit, it may also have been generated in the control unit via a random generator; in the embodiment shown, it has been entered by the user of the control unit B via an input interface of the control unit B. In an alternative variation, which is not shown here, the field device F1 is to requested by the control unit B to provide a new access key, which can be accomplished, for example, by a random number generator on the field device.

In the following figures, designs of the method 1 are shown with which the management of the new access key in the field device F1 or of a new access key assigned to the field device F1 can be achieved in a simple manner.

Figure 2:
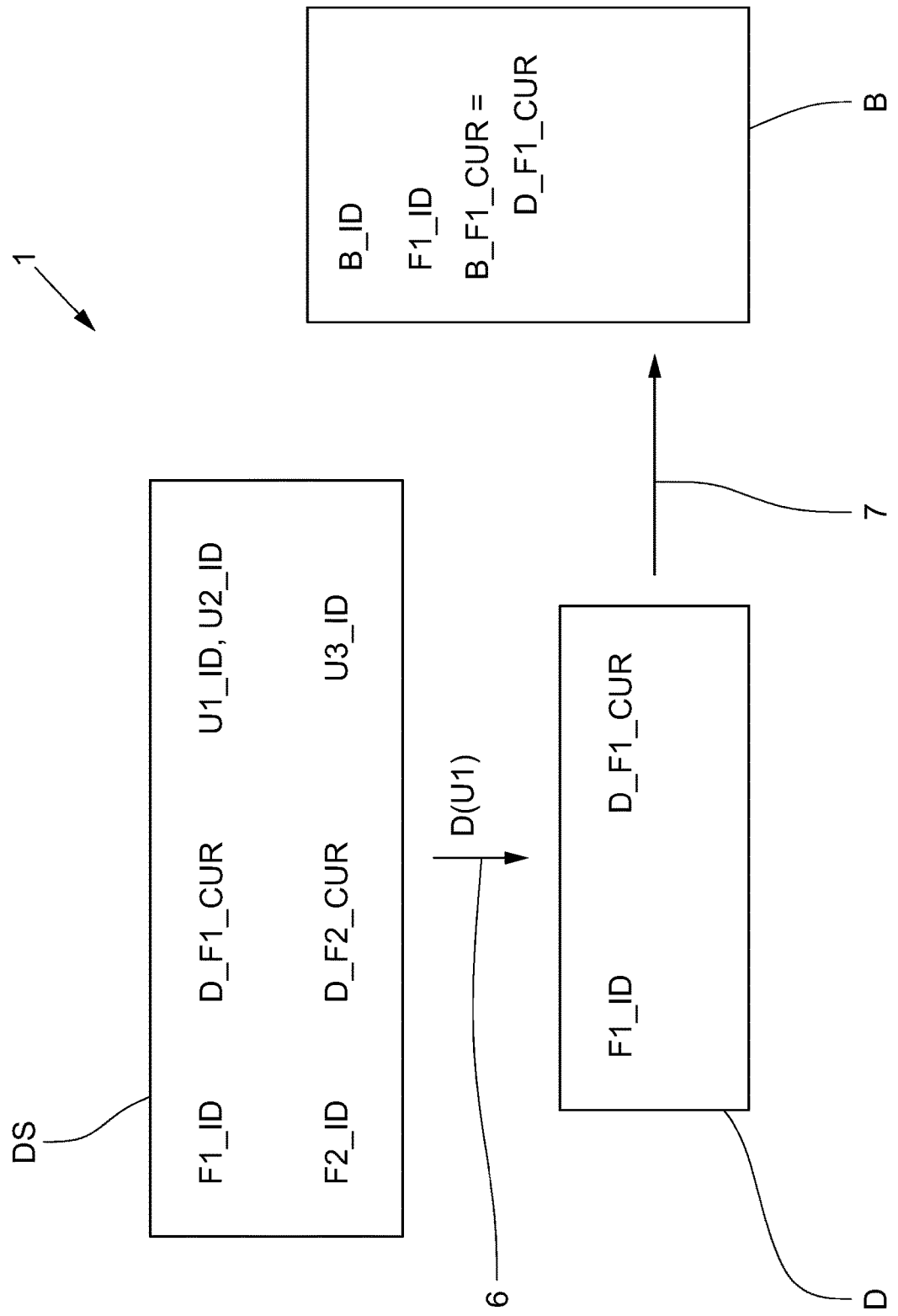
FIG. 2 schematically illustrates the method according to the invention using a database server with a key database and the generation and distribution of key data sets.

FIG. 2 shows that in the method 1 it is first the intention to provide a key database on a database server DS. The key database comprises for a plurality of field devices F1, F2 at least the field device identifier F1_ID, F2_ID of the respective field device F1, F2, the existing access key D_F1_CUR, D_F2_CUR of the respective field device F1, F2 and the identifier U1_ID, U2_ID, U3_ID of at least one access-authorized user U1, U2, U3. The key database could alternatively or additionally also comprise at least the identifier of a control unit B authorized to access the respective field device F1, F2. In the embodiment, however, the access authorization is bound to users U1, U2, U3.

FIG. 2 further shows that the database server DS generates a key data set D(U1) from the key database for an access-authorized user U1 6, wherein the key data set D comprises the field device identifier F1_ID and the existing access key D_F1_CUR of the respective field device F1 for the field device F1 in this case to which the access-authorized user U1 has access authorization.

The key data set D is then transmitted to the control unit B of the access-authorized user U1 7 so that the control unit B of the access-authorized user U1 has the existing access key B_F1_CUR=D_F1_CUR of the field device F1 for which access authorization exists. The method 1 thus enables central key management and individual key distribution to authorized users and/or authorized control units, which is an essential technical basis for the desired key organization and key distribution.

Figure 3:
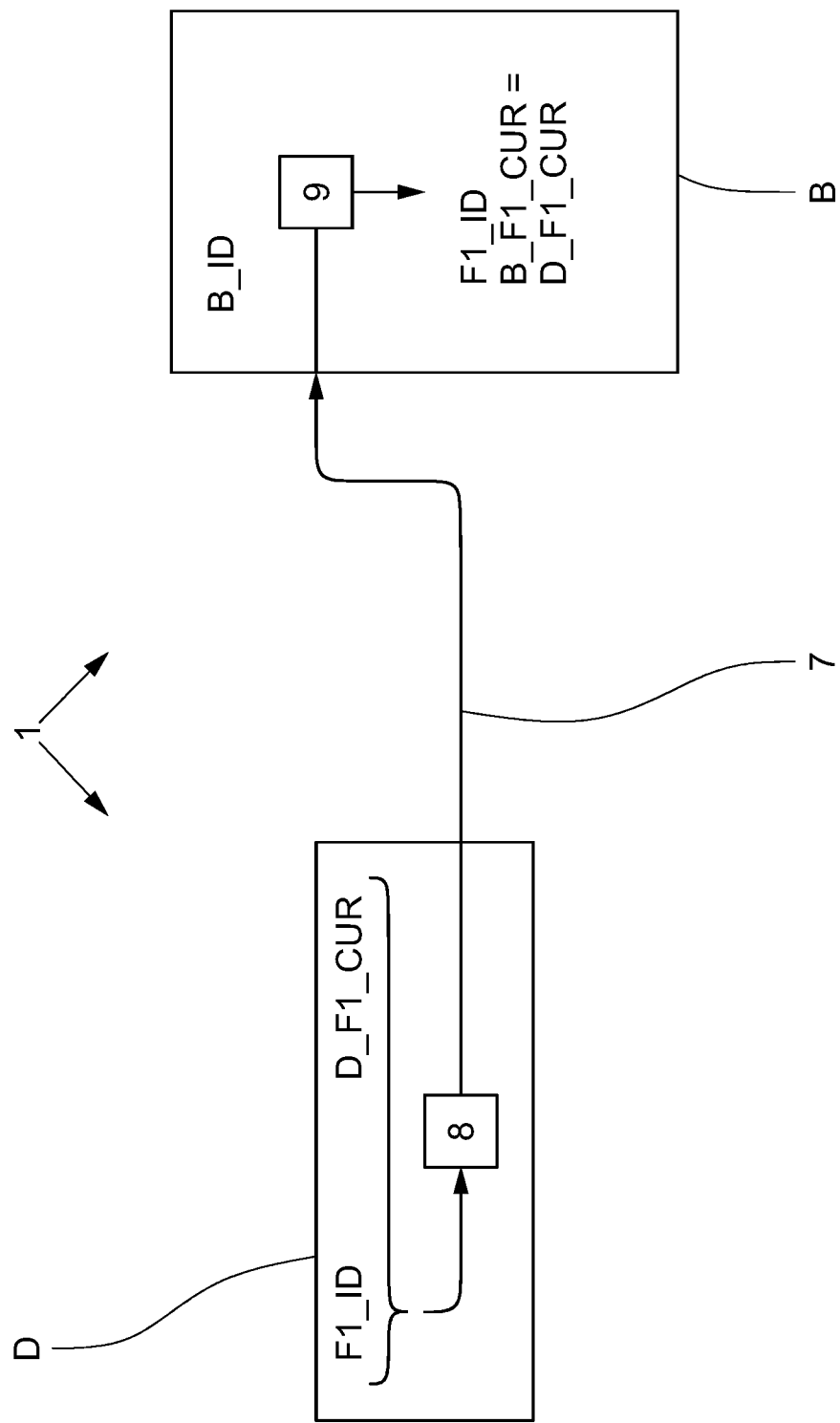
FIG. 3 schematically illustrates a design of the method with encryption and decryption of the key data set.

FIG. 3 shows a preferred design of the method 1 in which the key data set D is encrypted 8 prior to its transmission 7 to the control unit B of the access-authorized user U1, and in which the encrypted key data set D is decrypted 9 on the control unit B prior to use, thereby achieving additional data security in the method 1. In the illustrated embodiment, the encryption is implemented by means of an asymmetric key pair. The key data set is encrypted with the public key of the asymmetric key pair and decrypted on the control unit B of the access-authorized user U1 with the corresponding private key of the asymmetric key pair.

Figure 4:
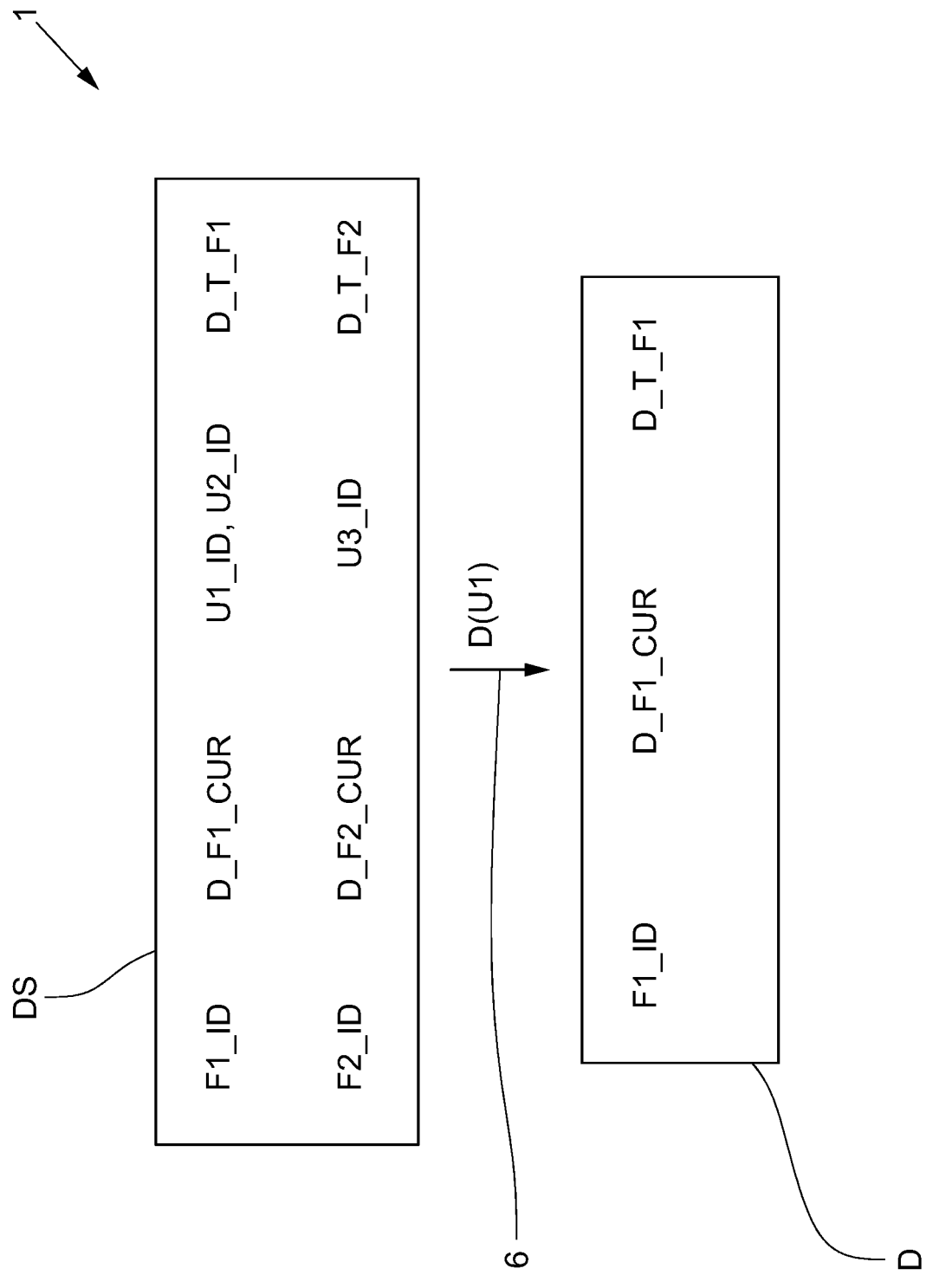
FIG. 4 schematically illustrates a design of the method with annotation of the original entry time of the existing access key.

FIG. 4 shows that in the key database and in the key data set D generated from the key database for the existing access keys D_F1_CUR, D_F2_CUR, the original entry time D_T_F1, D_T_F2 of the existing access key D_F1_CUR, D_F2_CUR is also noted, whereby it can be decided, if different existing access keys exist for a field device F1, which of the existing access keys is the most current existing access key. The same applies analogously to a key data set stored on a control unit. Here, too, the original entry time B_T_F1 of the existing access key B_F1_CUR is stored.

Figure 5:
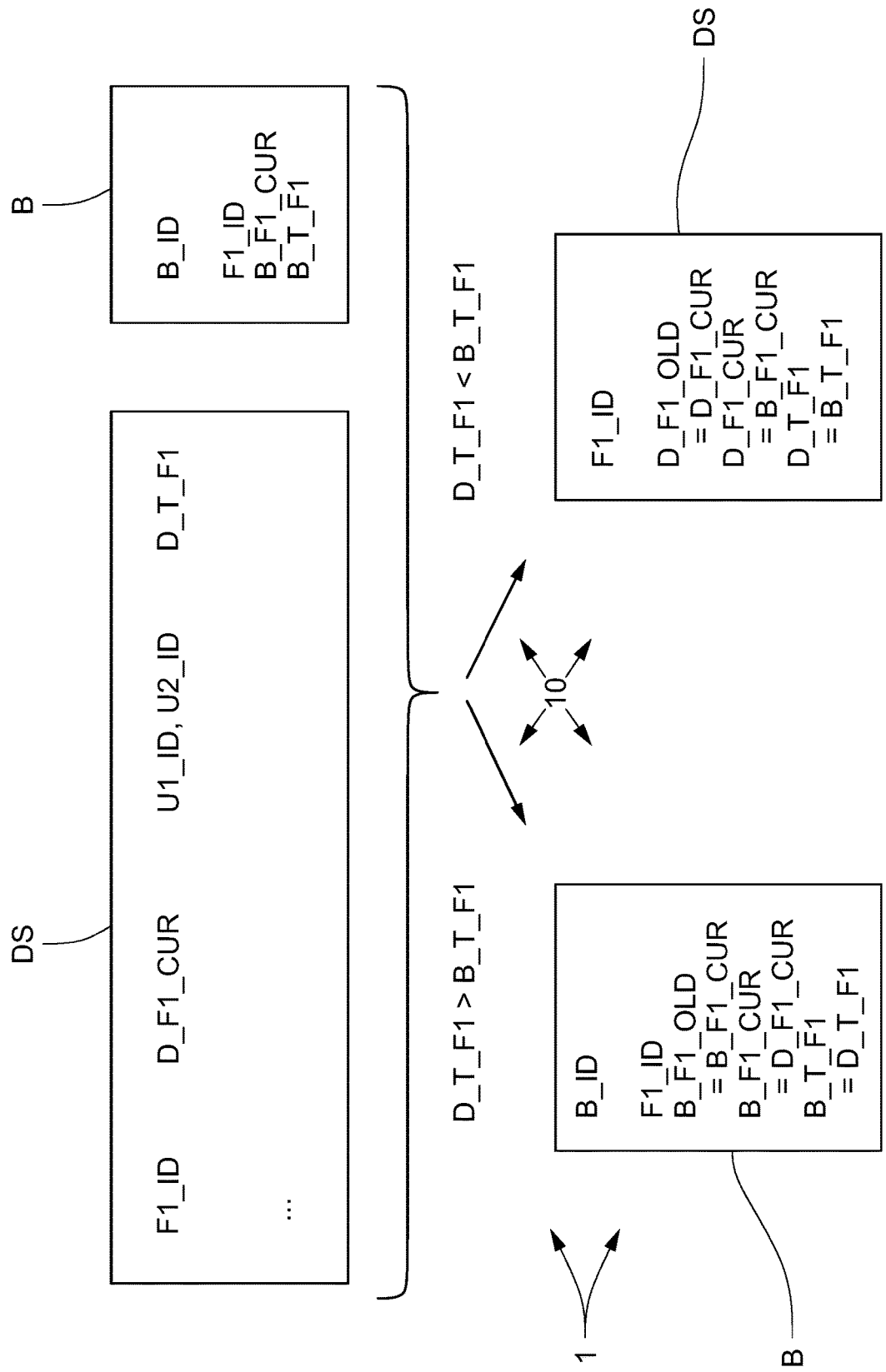
FIG. 5 schematically illustrates a synchronization step for data synchronization between the key database of the database server and the key data set of a control unit.

FIG. 5 shows the method 1, which has been supplemented by a synchronization step 10. In the synchronization step 10, the key database of the database server DS and the key data set D of the control unit B are compared with respect to the entry times D_T_F1, B_T_F1 of corresponding existing access keys D_F1_CUR, B_F1_CUR of the field device F1. In case of deviating entry times D_T_F1, B_T_F1, indicated in FIG. 5, the newer existing access key D_F1_CUR, B_F1_CUR is entered with its entry time where only the older existing access key D_F1_CUR, B_F1_CUR is available, so that the key database of the database server DS and the key data set D of the control unit B have matching existing access keys D_F1_CUR, B_F1_CUR for the respective field device F1.

The described procedure is illustrated for the case that the existing access key D_F1_CUR for the field device F1 stored in the key database on the database server DS has a later entry time D_T_F1 than the entry time B_T_F1 in the key data set of the control unit B (arrow pointing to the left) and for the other case that the existing access key D_F1_CUR for the field device F1 stored in the key database on the database server DS has an earlier entry time D_T_F1 than the entry time B_T_F1 in the key data set of the control unit B (arrow pointing to the right).

In the embodiment, the entry times D_T_F1, B_T_F1 are also entered accordingly. Furthermore, in the embodiment shown, the synchronization step 10 is carried out automatically as soon as the control unit B connects to the key database of the database server DS. In the embodiment shown in FIG. 5, the synchronization step 10 is further implemented in such a way that the subsequently entered newer existing access key does not replace the older existing access key, i.e., it replaces it in such a way that the older existing access key is no longer available, but rather the subsequently entered newer existing access key is noted in addition to the older existing access key so that the previously valid existing access key is also still available (illustrated in FIG. 5 by B_F1_OLD=B_F1_CUR and D_F1_OLD=D_F1_CUR). Even older existing access keys are deleted here, so that only the last two most recent versions of the existing access key (B_F1_OLD and B_F1_CUR or D_F1_OLD and D_F1_CUR) are available. In another design of the method, not shown here, existing access keys from older entry times that are further back in time are also stored.

With the various components of the previously described method 1, the specification of a new access key B_F1_New via the control unit B can now be described as follows, wherein a new figure is not required; the necessary steps are shown in principle in FIGS. 1 and 5. The control unit B has a new access key B_F1_NEW for the field device F1, which has been given to the control unit here by the user U1. The new access key B_F1_NEW is specified to the field device F1 by the HMI B connected to the field device F1 via the communication link 2 and the new access key B_F1_NEW is stored by the field device F1 as the new existing access key F1_CUR 5. The HMI B stores the new access key B_F1_NEW as the new existing access key B_F1_CUR in its key data set. The control unit B then connects to the key database of the database server DS and initiates the synchronization step 10. There are implementations of method 1 in which it is not immediately possible to initiate the synchronization step 10 immediately, for example because it is not possible to contact the database server DS immediately. Then the synchronization step 10 is carried out with a time lag when a connection to the database server DS can be established.

Figure 6:
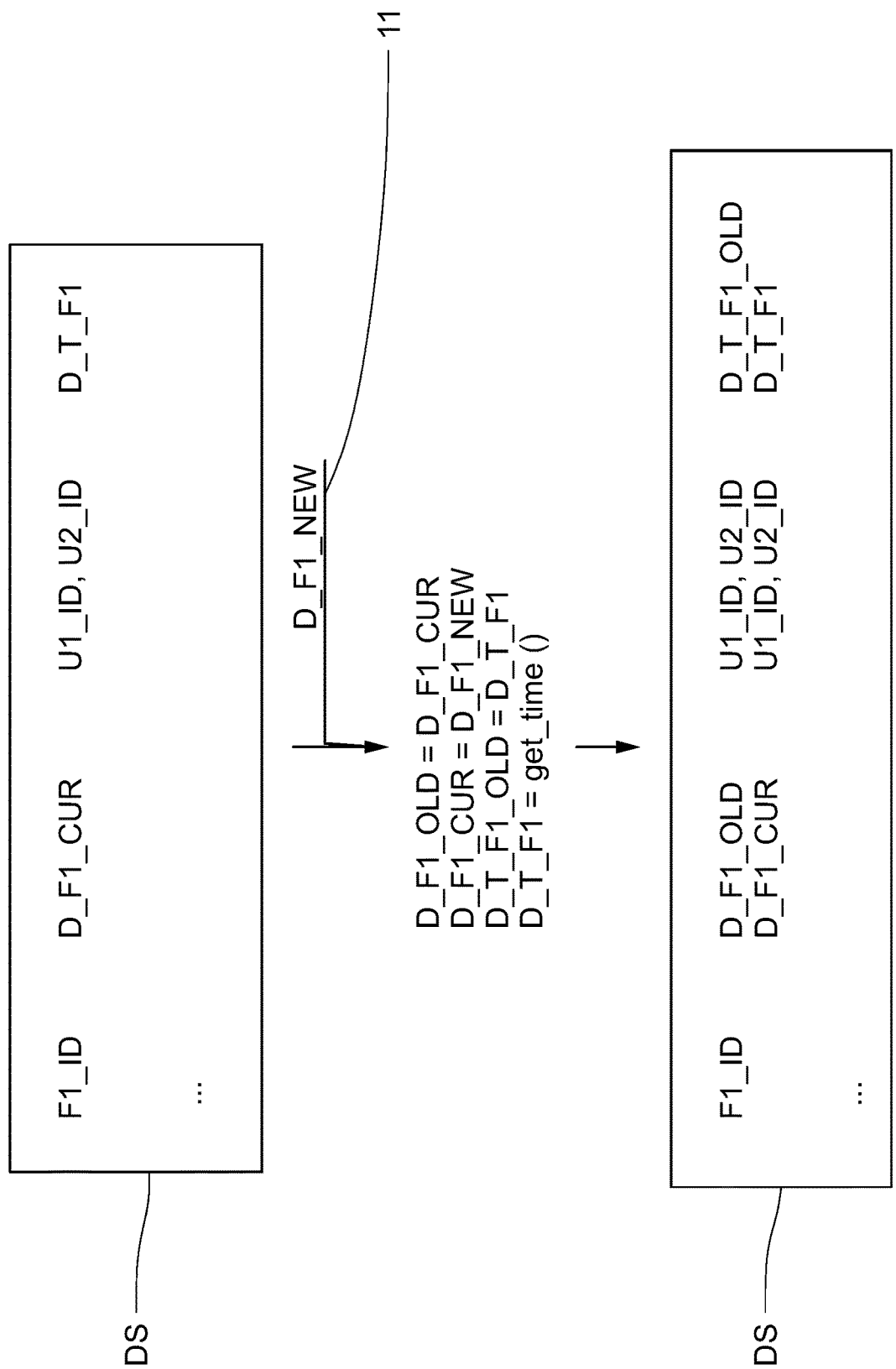
FIG. 6 schematically illustrates the provision of a new access key via the database server.

In FIG. 6, the method 1 is described, wherein the provision 11 of a new access key D_F1_NEW is carried out via the database server DS. A new access key D_F1_NEW for the field device F1 is provided 11 to the key database of the database server DS. The new access key D_F1_NEW is stored in the key database of the database server DS for the field device F1 as a new existing access key D_F1_CUR, and the last valid existing access key D_F1_CUR for the field device F1 remains stored in the key database as the old existing access key D_F1_OLD. The entry time D_T_F1_OLD of the old existing access key is also stored here. At the time of the new entry of the new existing access key the entry time D_T_F1 is captured (get_time( )). When the key data set D is generated from the key database, the existing access key D_F1_CUR and at least the last valid existing access key D_F1_OLD for the field device F1 are included in the key data set D. In the synchronization step 10, when the newest existing access key (B_F1_CUR=D_F1_CUR) is subsequently entered in the control unit B, at least the previously valid older existing access key (B_F1_OLD=B_F1_CUR) is retained (see also FIG. 5).

Figure 7:
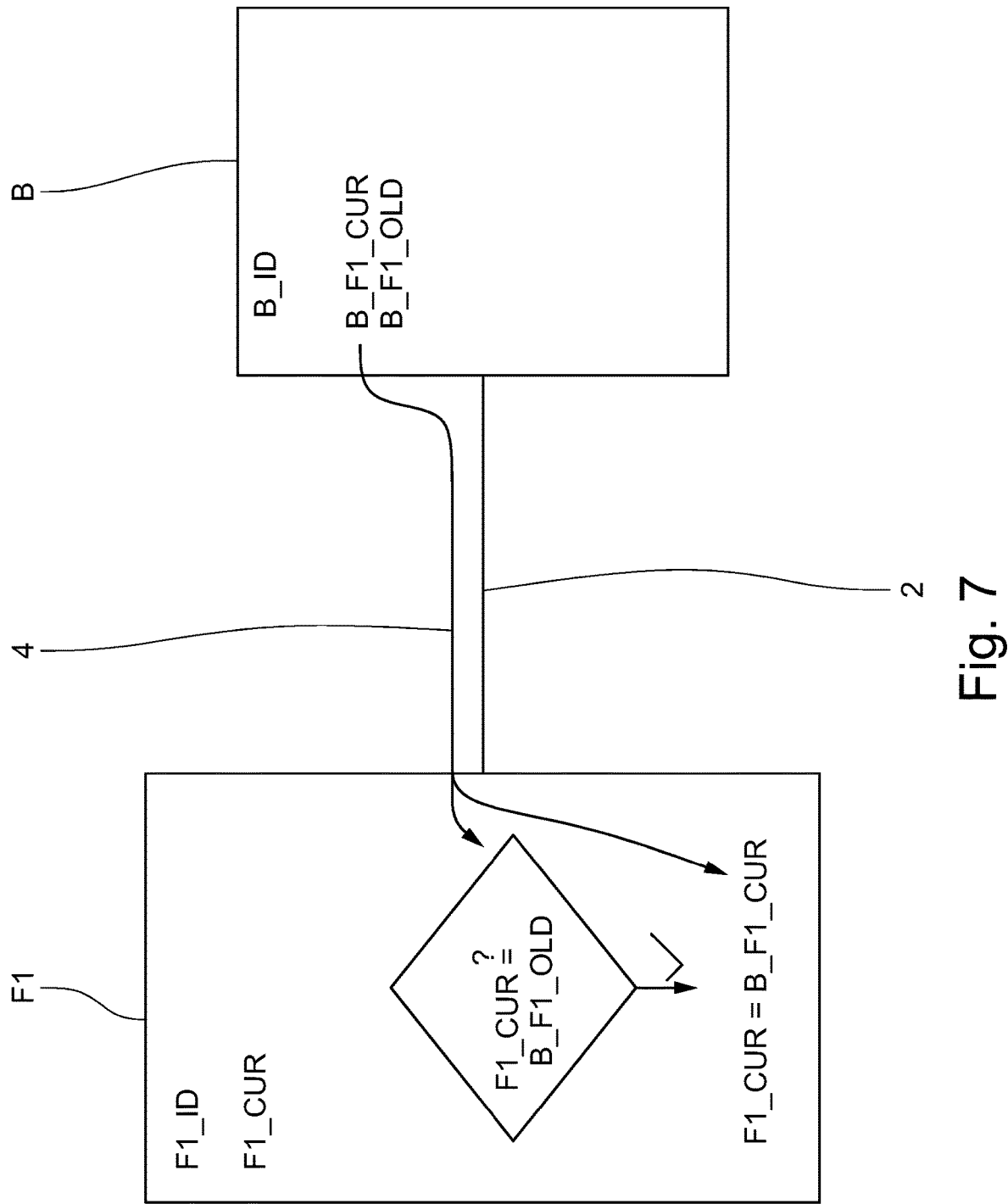
FIG. 7 schematically illustrates the transfer of a new access key from a control unit to a field device, wherein the new access key is the existing access key of the control unit.

FIG. 7 shows schematically the method 1 for the case of passing on a new access key from the control unit B to the field device F1, wherein the new access key is the existing access key B_F1_CUR of the control unit B. The control unit B is connected to the field device F1 to which it has access authorization. The control unit B has the key data set with the existing access key B_F1_CUR and the previously valid existing access key B_F1_OLD for the field device F1. To obtain access authorization to the field device F1, the control unit B uses the previously valid existing access key B_F1_OLD, and when access authorization is available, the control unit B transmits the existing access key B_F1_CUR to the field device F1 as a new access key. In the event that the control unit with the previously valid existing access key B_F1_OLD does not receive access authorization, the control unit B transmits the existing access key B_F1_CUR to check 3 the access authorization, so that the case is also covered that the existing access key in the field device F1 has already been replaced by the new access key beforehand, for example by another control unit.

In an alternative procedure, which is not shown here, the method 1 provides that the control unit B is connected to the field device F1 to which it has access authorization, that the control unit B has a key data set with the existing access key B_F1_CUR and the previously valid existing access key B_F1_OLD for the field device F1, in that the control unit B first uses the existing access key B_F1_CUR to obtain access authorization to the field device F1 and, if access authorization is denied, uses the previously valid existing access key B_F1_OLD. Thus, in this embodiment example, the check sequence is reversed when checking 3 the access authorization.

Figure 8:
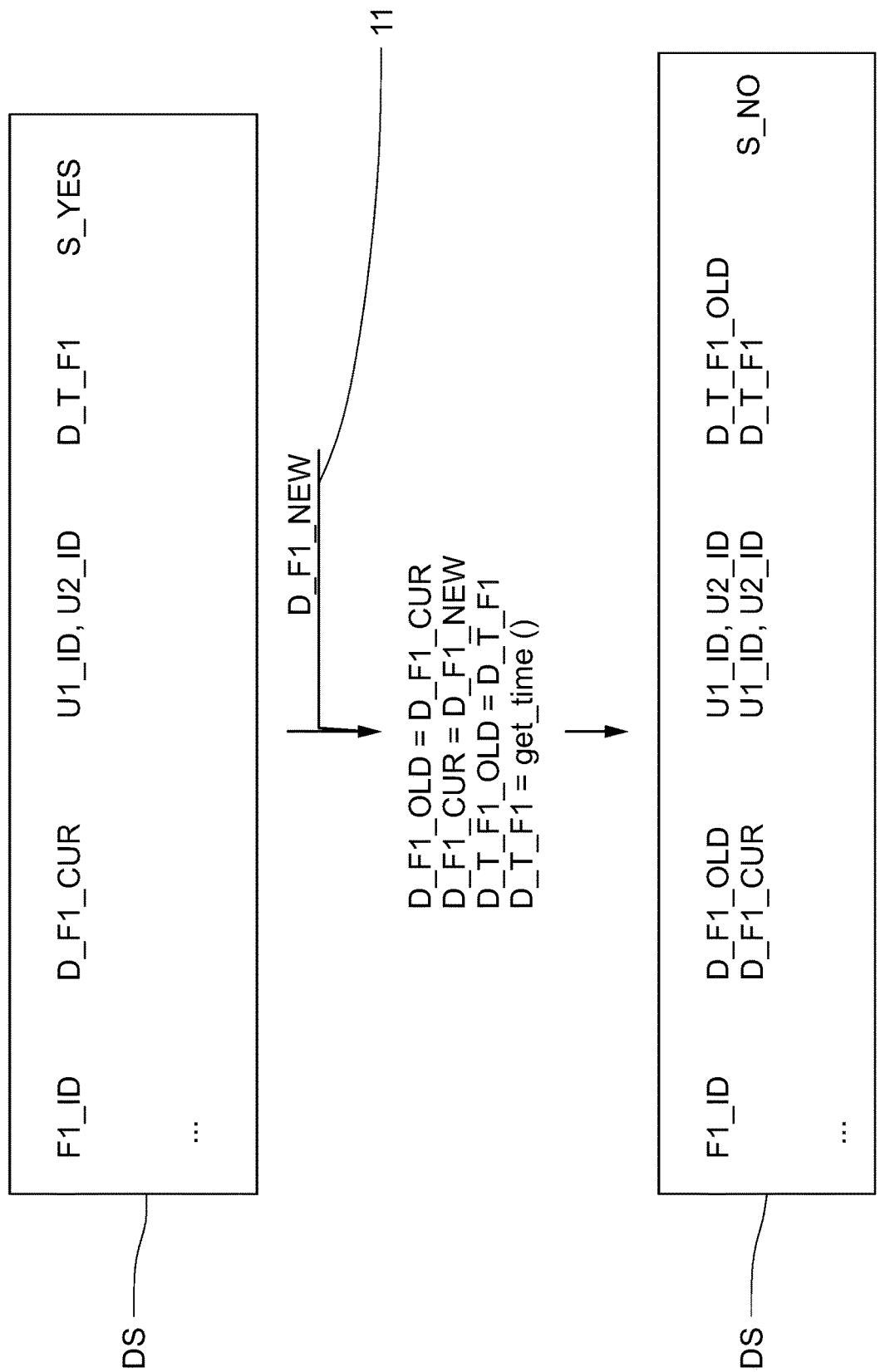
FIG. 8 schematically illustrates, in part, the method for changing an existing access key in a field device using a synchronization flag.

FIG. 8 proposes a further development of the method 1 comprising a secure indicator for indicating a new existing access key successfully stored on the field device F1. The method 1 is characterized in that the new access key D_F1_NEW, which is provided 11 and stored in the key database of the database server DS for the field device F1 as the new existing access key D_F1_CUR (similar to FIG. 6), is provided with a synchronization flag S, wherein the synchronization flag S indicates whether the new existing access key D_F1_CUR is stored on the field device F1 (S_YES) or is not stored on the field device (S_NO). In the example shown, the synchronization flag for the existing access key D_F1_CUR indicates that the existing access key D_F1_CUR has been stored on the field device F1 S_YES (upper block in FIG. 8) before a new existing access key D_F1_NEW is provided.

When the new access key D_F1_NEW is saved for the first time as the new existing access key D_F1_CUR, the synchronization flag S indicates that the existing access key D_F1_CUR is not stored on the field device F1 S_NO. When the key data set is generated (not shown), the synchronization flag is also included in the key data set. In the following to synchronization step (not shown), the synchronization flag S is also synchronized, i.e., also transferred to the control unit with the key data set. When the new existing access key has been successfully transferred to the field device—as described above—the synchronization flag is changed from "existing access key not stored on field device" (S_NO) to "existing access key stored on field device" (S_YES) on the control unit. During a further synchronization process, the synchronization flag at the existing access key for the field device F1 in the key database of the database server DS is then changed from S_NO ("existing access key not stored on the field device") to S_YES ("existing access key stored on the field device").

In other words, the method 1 using the synchronization flag S provides that the control unit B is connected to the field device F1, that the control unit B evaluates the synchronization flag S of the existing access key B_F1_CUR and in the case, that the synchronization flag S indicates "existing access key not stored on the field device" S_NO, the control unit uses the previously valid existing access key B_F1_OLD to obtain access authorization to the field device F1 and otherwise uses the existing access key B_F1_CUR.

Furthermore, it is provided that the control unit B connected to the field device F1 to which it has access authorization changes the synchronization flag S of the transmitted new existing access key B_F1_CUR to "existing access key stored on field device" S_YES in its key data set after transmission of the new existing access key B_F1_CUR to the field device F1.

Using the synchronization flag S, it is therefore possible to specifically detect whether a transmission of a new existing access key D_F1_CUR to the field device F1 has taken place or not, so that the control unit B also detects which access key it must select for access to the field device F1, and whether depositing an existing access key B_F1_CUR on the field device F1 as a new existing access key is still necessary or not. The method 1 also allows detection at the database server DS of whether and when the planned password change has been implemented.

The invention claimed is:
1. A method for changing an existing access key in a field device in automation technology, wherein a field device identifier and the existing access key are stored in the field device, wherein a control unit can be connected to the field device via a communication link, wherein a control unit identifier and an existing access key are stored in the control unit, wherein the field device checks the access authorization of the control unit by at least indirect evaluation of the existing access key and the existing access key of the control unit, and wherein, when the access authorization is present, the control unit agrees on a new access key with the field device that stores as a new existing access key, the method comprising:
   providing a key database on a database server and the key database for a plurality of field devices contains at least the field device identifier of the respective field device, the existing access key of the respective field device and the identifier of at least one of a user authorized to access and a control unit authorized to access the respective field device;

generating, by the database server, a key data set for the at least one of the user authorized to access and the control unit authorized to access from the key database, wherein the key data set for the field devices, to which the at least one of the access-authorized user and the access-authorized control unit has access authorization, includes the field device identifier and the existing access key of the respective field device; and transferring the key data set to the control unit of the at least one of the access-authorized user and the access-authorized control unit, causing the control unit of the at least one of the access-authorized user and the access-authorized control unit to have the existing access keys of the field devices for which an access authorization exists;

wherein the original entry time of the existing access key is also noted in at least one of the key database, the key data set generated from the key database, and the key data set of the control unit for the existing access keys;

wherein, in a synchronization step, the key database and the key data set of at least one control unit are compared with regard to the entry times of corresponding existing access keys, and, if the entry times differ, the newest existing access key is subsequently entered there with an entry time, where only the older existing access key is present, causing the key database and the key data set of the control unit to have matching existing access keys for the respective field device;

wherein a new access key for the field device is provided to the key database of the database server, and the new access key is stored by the key database for the field device as a new existing access key, and at least the last valid existing access key for the field device remains stored in the key database as an old existing access key;

wherein, when the key data set is generated, the existing access key and at least the last valid existing access key for the field device are included in the key data set;

wherein, in the synchronization step, when the latest existing access key is subsequently entered in the control unit, at least the previously valid older existing access key is retained;

wherein the new access key is stored in the key database for the field device as a new existing access key and is provided with a synchronization flag;

wherein the synchronization flag indicates whether the new existing access key is stored on the field device or is not stored on the field device; and wherein the synchronization flag indicates that the existing access key is not stored on the field device, wherein the synchronization flag is included in the key data set when the key data set is generated, and wherein the synchronization flag is adjusted in the synchronization step, but the synchronization flag is only changed from "existing access key not stored on the field device" to "existing access key stored on the field device".

2. The method according to claim 1, wherein the key data set is encrypted before transmission to the control unit of the at least one of the access-authorized user and the access-authorized control unit, and the encrypted key data set is decrypted on the control unit before use.

3. The method according to claim 1, wherein a new access key is provided to the field unit by the control unit connected to the field unit via the communication link, and the new access key is stored by the field unit as a new existing access key;

wherein the control unit stores the new access key as a new existing access key in the key data set; and wherein the control unit either establishes a link to the key database of the database server and initiates the synchronization step or requests the user of the control unit to establish a link to the key database in order to be able to carry out the synchronization step.

4. The method according to claim 1, wherein the control unit is connected to the field device to which it has access authorization;

wherein the control unit has a key data set with the existing access key and the previously valid existing access key for the field device;

wherein the control unit uses the previously valid existing access key to obtain access authorization to the field device and transmits the existing access key as a new access key to the field device when the access authorization is available.

5. The method according to claim 1, wherein the control unit is connected to the field device to which it has access authorization;

wherein the control unit has a key data set with the existing access key and the previously valid existing access key for the field device;

wherein the control unit first uses the existing access key to obtain access authorization to the field device and, if access authorization is denied, uses the previously valid existing access key.

6. The method according to claim 1, wherein the control unit is connected to the field device, the control unit evaluates the synchronization flag of the existing access key and in that case;

wherein the synchronization flag indicates "existing access key not stored on the field device", the control unit uses the previously valid existing access key to obtain access authorization to the field device and otherwise uses the existing access key.

7. The method according to claim 6, wherein the control unit is connected to the field device to which it has access authorization, and the control unit changes the synchronization flag of the transmitted new existing access key to "existing access key stored on field device" in the key data set after transmission of the new existing access key to the field device.

8. The method according to claim 1, wherein the synchronization step is carried out automatically after a control unit connects to the key database of the database server.

* * * * *